United States Patent Office 2,839,086
Patented June 17, 1958

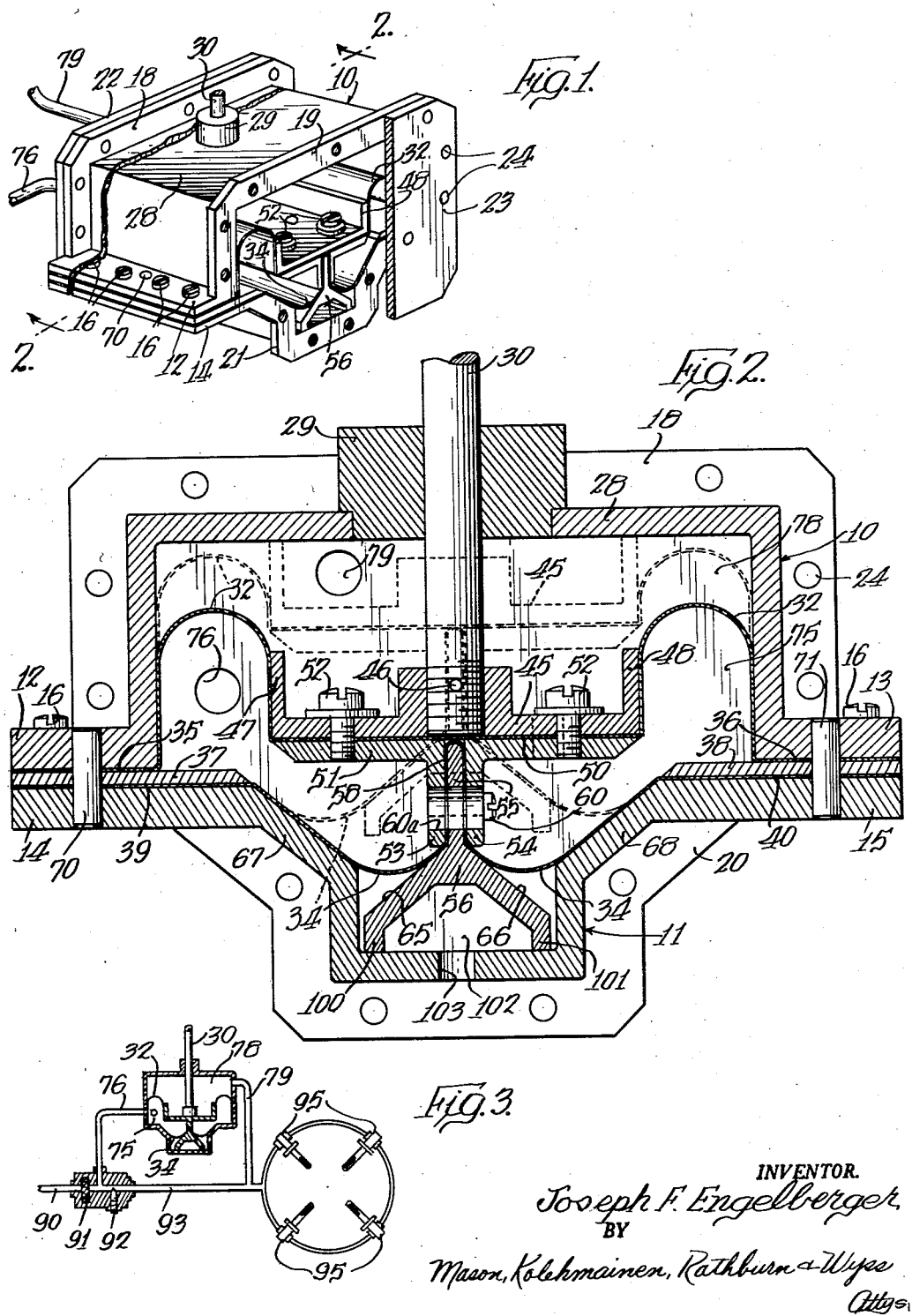
June 17, 1958   J. F. ENGELBERGER   2,839,086
LIMP DIAPHRAGM ACTUATOR
Filed May 6, 1955
INVENTOR.
Joseph F. Engelberger
BY
Mason, Kolehmainen, Rathburn & Wyss
Attys.

2,839,086

LIMP DIAPHRAGM ACTUATOR

Joseph F. Engelberger, Monroe, Conn., assignor, by mesne assignments, to Consolidated Controls Corp., a corporation of New York Application May 6, 1955, Serial No. 506,488

9 Claims. (Cl. 137—784)

The present invention relates to pressure responsive actuators, and, more particularly, to pressure responsive actuators of the diaphragm type wherein changes in pressure of a measured variable are converted into corresponding motion of an output shaft. While the invention is of general application in the diaphragm actuator field it has particular utility in high temperature applications such as those encountered in aircraft turbine control systems. The invention, therefore, will be described in connection with a gas turbine control system wherein there is provided a pressure ratio type actuator which may be used at high temperatures and wherein the spring rate normally encountered in pressure responsive actuators of this type is substantially eliminated.

In the pressure responsive actuator field, prior art arrangements have heretofore proposed the use of a piston and cylinder arrangement wherein a round diaphragm, usually of rubber or woven fibers bonded together, is clamped at the periphery thereof to the cylinder wall and is secured to the piston head so that variations in pressure on the diaphragm produce movement of the piston shaft. In these round diaphragm arrangements the effective diaphragm area may be varied by sloping the cylinder walls and piston head so that as the piston is moved the diaphragm is supported at varying diameters and hence has a variable effective area.

While such prior art arrangements are suitable for their intended purpose, they cannot be used at high temperatures, such, for example, as the temperatures encountered in jet aircraft control ssytems, since the organic materials used for these diaphragms are not sufficiently strong or stable to function properly at these high temperatures. Also, these organic materials may become contaminated and decompose when subjected to the deleterious effects of hot gases or other contaminants in the surrounding medium. Furthermore, a metal diaphragm cannot be used in these prior art limp diaphragm arrangements since the diaphragm must stretch in one direction as the piston moves. While other prior art arrangements have employed a metal diaphragm, they are unsatisfactory for pressure ratio control applications due to the fact that these metal diaphragms were stressed in proportion to the output movement and have an inherent spring rate which produces a variation in the pressure ratio measurement in accordance with changes in the absolute pressure level at which the ratio is taken. Furthermore, these stressed diaphragm arrangements have such a small total output movement that they are entirely unsuitable for control system applications wherein a relatively long actuator stroke is required.

It is, therefore, an object of the present invention to provide a new and improved limp diaphragm actuator.

It is another object of the present invention to provide a new and improved pressure responsive actuator wherein a limp metal diaphragm may be employed as the pressure responsive element.

It is a further object of the invention to provide a new and improved limp diaphragm actuator which may be employed at high temperatures to provide accurate pressure measurement.

It is a still further object of the present invention to provide a new and improved limp metal diaphragm actuator wherein the diaphragm has substantially no spring rate.

Another object of the present invention resides in the provision of a new and improved pressure ratio responsive diaphragm actuator which may be used at high temperatures and is substantially insensitive to variations in the absolute pressure level.

A further object of the present invention resides in the provision of a limp metal diaphragm actuator wherein the diaphragm is not stretched or distorted throughout the full stroke of the actuator.

A still further object of the present invention resides in the provision of a new and improved method of making a limp diaphragm actuator wherein extremely close tolerances are provided between the movable edges of the diaphragm and the actuator body to minimize leakage therebetween.

Briefly, in accordance with one aspect of the invention, a rectangular diaphragm actuator is provided wherein the diaphragm is supported on the body of the actuator only on two opposed sides thereof, a movable piston supporting the intermediate portion of the diaphragm. The diaphragm is made of relatively thin, flexible metal and the unsupported edge portions of the diaphragm are in contiguity with the end plates of the actuator body to provide an effective seal, this seal being obtained in accordance with the method of the present invention by finishing the ends of the diaphragm, the actuator body and the end plates to a high degree of flatness so that leakage around the unsupported end portions of the diaphragm is minimized. With this arrangement the diaphragm is not stretched at any point during the entire stroke of the actuator, but instead forms true catenaries between the supporting edges of the actuator body and piston so that the diaphragm assumes the ideal shape to keep stresses thereon to a minimum. Furthermore, the actuator has substantially no spring rate since the metal diaphragm is flexed only in two dimensions and movement of the piston does not produce any appreciable change in stress on the diaphragm. Even though the unsupported end portions of the diaphragm scrape against the end plates of the actuator body the resulting friction would be constant throughout the stroke of the actuator and the only effect thereof would be to introduce a dead band in the controlling action of the actuator. In accordance with a further aspect of the invention, a pressure ratio actuator is provided wherein two diaphragms of the above described type are employed, the area of one of these diaphragms varying with actuator movement so that a linear stroke actuator is provided which has a unique output position for each pressure ratio and introduces substantially no spring rate so that variations in the absolute pressure level do not affect the operation of the actuator.

The invention, both as to its organization and method of operation, together with further objects and advantages thereof, will best be undertood by reference to the following specification taken in connection with the accompanying drawing, in which:

Fig. 1 is a perspective view of a limp diaphragm actuator embodying the features of the present invention, a portion of one of the end plates of the actuator being broken away to illustrate the diaphragm arrangement of the actuator;

Fig. 2 is a sectional view taken along the lines 2—2 of Fig. 1 and through the center line of the output shaft of the actuator; and Fig. 3 is a diagrammatic illustration of a control system wherein the actuator of the present invention is employed.

Referring now to the drawing, and more particularly to Figs. 1 and 2 thereof, the diaphragm actuator of the present invention is therein illustrated as comprising an upper housing member indicated generally at 10 and a lower housing member indicated generally at 11, the housing 10 being provided with the side flanges 12 and 13 and the housing 11 being provided with the side flanges 14 and 15, these side flanges being secured together by means of the bolts 16. The housing 10 is also provided with the end flanges 18 and 19 and the housing 11 is provided with the end flanges 20 and 21 to which the end plates 22 and 23 are secured by means of the bolts 24 so that a rectangular actuator unit is provided. In the top wall 28 of the upper housing 10 there is provided a bearing member 29 which slidably supports the output shaft 30 of the actuator, it being understood that a suitable packing gland of high temperature material may be employed between the shaft 30 and the bearing 29 to prevent leakage around the shaft 30, permitting the shaft 30 to be moved easily, as will be readily understood by those skilled in the art.

In the illustrated embodiment of the invention a pressure ratio type actuator is provided wherein a first limp diaphragm 32, of constant area, and a second limp diaphragm 34 of variable area are provided, the diaphragms 32 and 34 being preferably constructed of stainless steel and having a thickness of 0.001 inch so that the diaphragms 32 and 34 may be readily flexed in the manner described in more detail hereinafter. The opposed parallel sides 35 and 36 of the diaphragm 32 are clamped between the side flanges 12 and 13 of the housing 10 and a pair of spacer members 37 and 38, respectively. In a similar manner, the opposed parallel sides 39 and 40 of the diaphragm 34 are clamped between the spacer members 37, 38 and the side flanges 14 and 15 of the lower housing member 11.

A rectangular piston head 45 is threaded onto the end of the output shaft 30 of the actuator within the upper housing 10 and is secured thereto by means of the roll pin 46, the piston 45 being provided with the opposed parallel skirt portions 47 and 48. The intermediate portion 50 of the constant area diaphragm 32 is clamped against the bottom surface of the piston head 45 by means of a clamping member 51 which is secured to the piston head 45 by means of the bolts 52, it being understood that the skirt portions 47, 48 of the piston 45 are spaced from the walls of the housing 10 by an amount sufficient to permit the diaphragm 32 to flex without crimping or producing a permanent bend in the diaphragm throughout the stroke of the actuator.

The member 51 is provided with a pair of opposed, parallel, downwardly extending flanges 53 and 54 which are adapted to receive therebetween hte upstanding flange portion 55 of a second clamping member 56, the member 56 being of inverted Y-shaped cross section. The intermediate portion 58 of the variable area diaphragm 34 is positioned over the flange 55 and is clamped between the opposed flanges 53 and 54 by means of the bolts 60, the opening 60a being provided through the flanges 53, 54 and the diapragm 34 to equalize pressure on both sides of these flanges. It will thus be evident that the constant area diaphragm 32 is supported throughout the entire length of the piston head 45 although the opposed ends of the diaphragm 32 are entirely unsupported in the areas between the piston head 45 and the walls of the housing 10 so that the diaphragm 32 assumes true catenaries between the supporting edges of the piston head 45 and the supporting edges of the housing 10. In a similar manner, the variable area diaphragm 34 is supported throughout the length of the opposed flanges 53, 54 although the opposed ends of the diaphragm 34 are completely unsupported between the member 56 and the housing 11 so as to permit the diaphragm to form true catenaries between the sloping surfaces 65 and 66 of the member 56 and the sloping walls 67 and 68 of the lower housing 11. The ends of the piston head 45 and the clamping members 51 and 56 are preferably spaced from the inner surfaces of the end plates 22 and 23 by about 0.010 inch to provide sufficient clearance so that the ends of these members do not strike the end plates 22, 23 throughout the stroke of the actuator which, at the same time, provide adequate support for the clamped portions of the diaphragms 32 and 34.

In order to provide a very small gap, preferably in the order of 0.0001 inch, between the unsupported end portions of the diaphragms 32 and 34 and the inner surfaces of the end plates 22 and 23, the ends of the housings 10 and 11 are filled with a low melting point solder, with the end plates 22, 23 removed, so that the piston 45, the members 51 and 56 and the diaphragms 32 and 34 are prevented from moving, relative to the housings 10 and 11. The entire exposed end portions of the actuator unit including the surfaces of the end flanges 18, 20 and 19, 21, the ends of the members 51 and the ends of the diaphragms 32 and 34 are finished to a high degree of flatness by a suitable grinding operation followed by a suitable lapping operation. The inner surfaces of the end plates 22 and 23 are also subjected to a similar grinding and lapping operation. Preferably, the diaphragms 32 and 34, which are of thin sheet metal, are initially cut slightly larger than the housings 10 and 11 so that the ends of these diaphragms initially extend beyond the end flanges 18, 20 and 19, 21. During the above described grinding operation the cut edges of the diaphragms, which may be deformed during the cutting operation, are removed so that an extremely narrow gap between the diaphragms and the end plates may be achieved. After the end portions of the actuator have been finished to a close tolerance in the manner described above, the solder is melted and removed from the housings 10 and 11 so that the piston 45 and diaphragms 32, 34 are thereafter free to move with respect to the housings 10 and 11, and the end plates 22 and 23 are then bolted in position. Preferably, a solder which melts at about 165° F. is used so that the solder can be removed by merely flushing out the housings 10 and 11 with boiling water.

When the end portions of the actuator unit are precision ground in the manner described above, the end portions of the diaphragms 32 and 34 are very closely spaced to the end plates 22 and 23 so that an effective seal between these members is provided while permitting the diaphragms to assume the desired catenary shape so that stresses on the diaphragm are minimized.

In order to prevent the housings 10 and 11 from moving relative to each other during the end grinding and lapping process described above, the flanges 12, 14 and 13, 15 are drilled to receive suitable dowel pins 70 and 71 which maintain the housings 10 and 11 in the desired registration during the grinding and lapping operations.

In the illustrated embodiment, air is admitted to the chamber 75 between the diaphragms 32 and 34 through a suitable inlet 76 which may be positioned in the end plate 22. Air is also introduced from another source into the chamber 78 between the diaphragm 32 and the upper wall 28 of the housing 10 through the inlet 79.

In considering the operation of the actuator of the present invention, reference may be had to Fig. 3 wherein the actuator is employed in a control system to produce a control movement of the output shaft 30 in accordance with the pressure ratio developed in a gas turbine overtemperature control system. Thus, compressor discharge air is supplied through the conduit 90, the filter unit 91 and the conduit 76 to the chamber 75 between the diaphragms 32 and 34. The compresser discharge air is also supplied through a restricting orifice 92, which may be either fixed or variable, to provide a control pressure which is supplied through the conduit 93 and the conduit 79 to the chamber 78 within the actuator unit. This control pressure is also connected to four paralleled temperature sensitive control units 95, each of the control units 95 being provided with a bleed orifice which vents the control pressure line 93 to the atmosphere within a predetermined high temperature control band. Each of the high temperature control units 95 may be substantially identical to the corresponding control unit shown and described in detail in a copending application of Rudolf Beck, Hans W. Kretsch and Robert W. Stewart, Serial No. 439,784, filed June 28, 1954, and assigned to the same assignee as the present invention, and reference may be had to this copending application for a detailed description of a suitable temperature control unit 95. Movement of the output shaft 30 may be employed to actuate any suitable mechanical control of the jet nozzle area, main fuel flow, or after burner fuel flow, of a jet engine power plant, as described in detail in the above identified copending application.

Considering now the operation of the system of Fig. 3, and assuming that the temperature of the hot gases measured by the units 95 is below the temperature control band, all of the control orifices in the units 95 will be closed so that the control pressure supplied over the conduits 93 and 79 to the control pressure chamber 78 will equal the pressure in the supply chamber 75. When the pressures on both sides of the diaphragm 32 are equalized the output shaft 30 is moved to its fully retracted position wherein the end flanges 100 and 101 of the member 56 rest on the bottom of the housing 11, the chamber 102 below the diaphragm 34 being vented to atmosphere through the opening 103. As the gas stream temperature increases, the control orifices of the temperature control units 95 open so that pressure in the control line 93 is vented to atmosphere and the control pressure in the chamber 78 is thereby reduced proportionately. Accordingly, the output shaft 30 is moved upwardly until the effective area of the variable area diaphragm 34 becomes sufficiently large to balance the pressures set up in the chambers 75, 78 and 102. A further increase in temperature will result in proportional reduction of the control pressure in the chamber 78 and consequent proportional extension of the output shaft 30 until the full temperature control range is travelled, at which time the piston head 45 assumes the position shown in dotted lines in Fig. 2 wherein the skirt portions 47, 48 thereof rest against the upper wall 28 of the housing 10 and the output shaft 30 is fully extended. It will thus be evident that the output shaft 30 of the pressure ratio actuator has a unique position for each value of the ratio between the supply pressure in the chamber 75 and the control pressure in the chamber 78 throughout the temperture control band so that the output shaft 30 has a substantially linear stroke throughout the desired control band. It will also be noted that the ratio between the supply pressure and the control pressure is a unique function of the ratio between the size of the restrictor 92 and the total effective orifice size of the four paralleled temperature control units 95.

With the above described arrangement, variations in the compressor discharge pressure supplied to the supply pressure chamber 75 do not produce movement of the output shaft 30 so that the control system functions properly over the wide range of compressor discharge pressures which are experienced in actual jet aircraft operation. This is because the limp diaphragms 32 and 34 have substantially no spring rate because the diaphragms 32 and 34 are not stretched or distorted in any way but instead are merely flexed as they roll on the opposed surfaces of the piston head and housings with the ends thereof in contiguity with the inner surfaces of the end plates. Preferably, the actuator unit is constructed as an elongated unit with the distance along the rolling edges of the diaphragms relatively large as compared to the distance along the ends which are in contiguity with the end plates so that leakage is reduced to a minimum.

In this connection it will be understood that even if the ends of the diaphragms have a scraping or wiping engagement with the end plates, the friction thus produced is constant throughout the stroke of the actuator and would merely result in a so-called dead band in the action of the overall control system. It will also be noted that the edges of the diaphragms act as self-cleaning knife edges with no appreciable contact area under which dirt particles from the pneumatic supply can lodge. Accordingly, a relatively long, limp diaphragm may be employed in accordance with the present invention as a long stroke actuator having characteristics similar to a conventional piston and cylinder arrangement but with the additional advantages of low friction and little susceptibility to dirt in the pneumatic supply. In this connection, it will be understood that a conventional piston with a long surface in contact with the cylinder walls can be easily jammed by small dirt particles which may be caught between the piston and the cylinder walls whereas with the self-cleaning knife edge action provided by the present invention, such jamming and binding of the piston are avoided. It will also be noted that if the diaphragms 32 and 34 expand more than the housings 10, 11, due to the hot gases supplied to the chamber 75, the edges of these diaphgrams move closer to the surfaces of the end plates to provide a better sealing action so that less hot gases are brought into the chamber. This temperature compensating action tends to prevent the diaphragm edges from being bent or jammed against the end plates.

While the limp diaphragm construction is particularly suitable for an actuator of the pressure ratio type for the reasons described in detail above, it will be understood that the principles of the present invention may be employed in many forms of diaphragm actuated devices. Thus, for example, the constant area diaphragm 32 may be employed by itself either to replace a conventional piston and cylinder arrangement or as a pressure responsive control unit wherein the piston head is biased to the desired control point by means of a calibrated spring or an evacuated bellows opposing the diaphragm, as will be readily understood by those skilled in the art. On the other hand, if a greater pressure ratio range is required the diaphragm 32 may be made a variable area diaphragm by providing suitable sloping wall portions for the piston head 45 and the upper housing 10.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A pressure responsive actuator, comprising a rectangular diaphragm, a body member, means for securing two opposed sides of said diaphragm to said body member, the other two sides of said diaphragm being movable with respect to said body member, and an output member connected to said diaphragm intermediate said secured opposed sides thereof and movable therewith.

2. A pressure responsive actuator, comprising a rectangular metallic diaphragm, a body member, means for supporting two opposed sides of said diaphragm on said body member, the other two sides of said diaphragm being movable with respect to said body member, and a rectangular piston head connected to said diaphragm intermediate said supported sides thereof.

3. A pressure responsive actuator, comprising a rectangular metal diaphragm, a body member having a rectangular opening therein, means for securing two opposed sides of said diaphragm to said body member adjacent corresponding opposed sides of said opening with the unsupported sides of said diaphragm contiguous to the two other sides of said rectangular opening and movable with respect thereto, and an output member mounted for movement within said rectangular opening and connected to said diaphragm.

4. A pressure responsive actuator, comprising a rectangular metal diaphragm, a body member having side walls and end walls defining a rectangular opening therein, means for positioning said diaphragm in said opening with two opposed sides thereof in engagement with said side walls, the other two sides of said diaphragm being contiguous to said end walls and movable with respect thereto, and a rectangular piston head mounted for movement within said opening and connected to said diaphragm.

5. A pressure responsive actuator, comprising a body member having side walls and end walls defining a rectangular opening therein, a piston movably mounted within said opening, and a thin, flexible, metal diaphragm connected to said piston and secured at opposite sides thereof to said body member adjacent said side walls, said diaphragm having opposed edges contiguous to said end walls and movable with respect thereto, thereby to produce a force on said piston in accordance with the pressure on said diaphragm.

6. A pressure responsive actuator, comprising a body member having side walls and end walls defining a rectangular opening therein, a piston movably mounted within said opening, and a thin, flexible, metal diaphragm connected to said piston and secured at opposite sides thereof to said body member adjacent said side walls, said diaphragm having opposed edges contiguous to said end walls and movable with respect thereto, said opposed edges being parallel to said end walls and in sufficiently close proximity thereto to minimize leakage between said diaphragm and said end walls.

7. A variable area pressure responsive actuator, comprising a body member having sloping side walls and perpendicular end walls defining a rectangular opening therein, a piston movably mounted within said opening and having sloping side walls which together with said body member side walls define a pair of V-shaped troughs, a thin, flexible diaphragm connected to said piston and positioned within said troughs, two opposed sides of said diaphragm being held in engagement with said body member adjacent said side walls and the other two opposed sides of said diaphragm being contiguous to said end walls and movable with respect thereto, thereby to produce a force on said piston in accordance with the pressure on said diaphragm.

8. A variable area pressure responsive actuator, comprising a body member having sloping side walls and perpendicular end walls defining a rectangular opening therein, closed at the ends thereof by said end walls, a piston movably mounted within said opening and having sloping side walls which together with said body member side walls define a pair of V-shaped troughs, a thin, flexible, diaphragm connected to said piston and positioned within said troughs, two opposed sides of said diaphragm being held in engagement with said body member adjacent said side walls and the other two opposed sides of said diaphragm being contiguous to said end walls and movable with respect thereto, whereby said diaphragm forms true catenaries between the supporting edges of said piston and said body member.

9. A pressure responsive actuator, comprising means defining a chamber having parallel end walls, a piston movably mounted within said chamber, a thin, flexible diaphragm connected to said piston and means for supporting said diaphragm only on two opposed side walls of said chamber with the ends of said diaphragm in contiguity with said parallel end walls of said chamber and movable with respect thereto.

References Cited in the file of this patent

UNITED STATES PATENTS

| | | |
|---|---|---|
| 1,273,534 | Pierce | July 23, 1918 |
| 1,705,622 | Mallory | Mar. 19, 1929 |
| 2,070,751 | Reichel | Feb. 16, 1937 |
| 2,123,381 | Riechel | July 12, 1938 |
| 2,651,328 | Gamble | Sept. 8, 1953 |